March 24, 1953 — H. P. WILLIAMS — 2,632,372
AGRICULTURAL TOOL BRACKET
Filed Dec. 17, 1948 — 2 SHEETS—SHEET 1
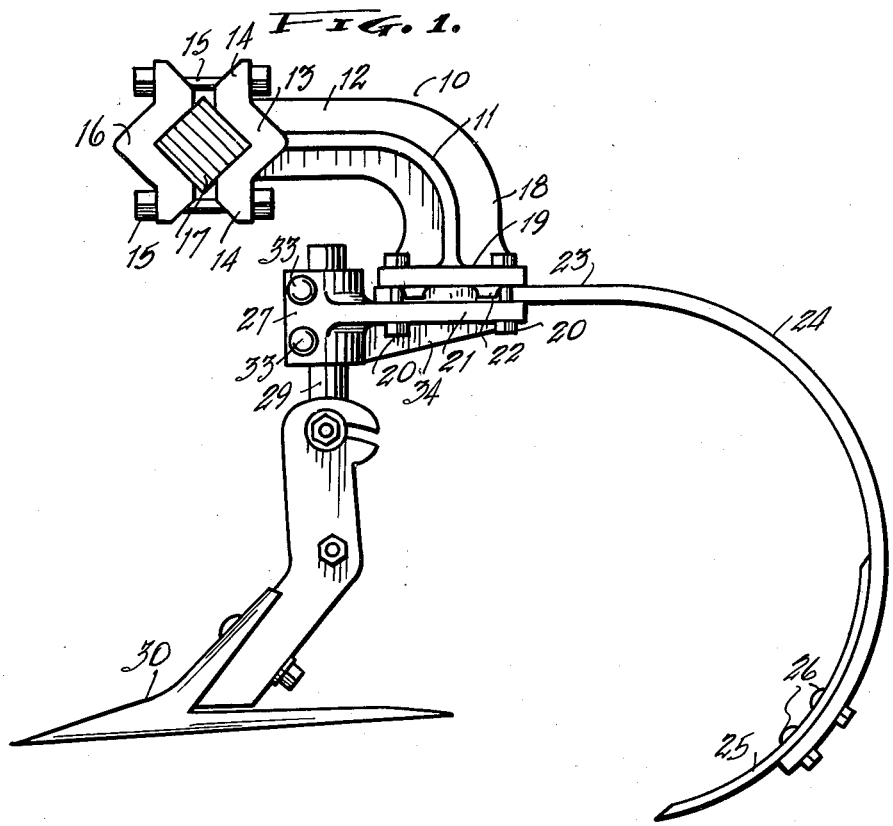
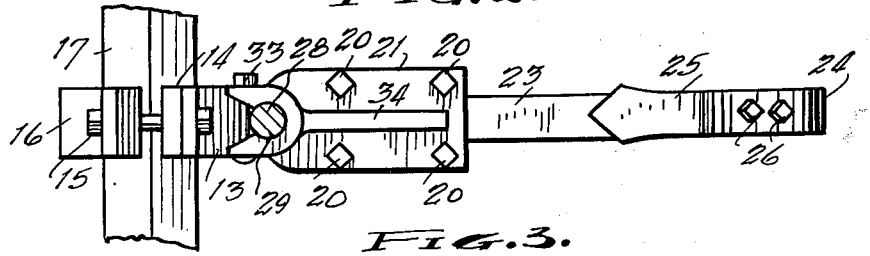
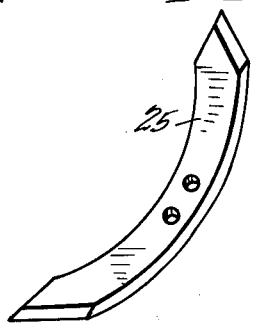
HUBERT P. WILLIAMS
INVENTOR.
BY Cecil L. Wood
ATTORNEY March 24, 1953 H. P. WILLIAMS 2,632,372
AGRICULTURAL TOOL BRACKET
Filed Dec. 17, 1948 2 SHEETS—SHEET 2
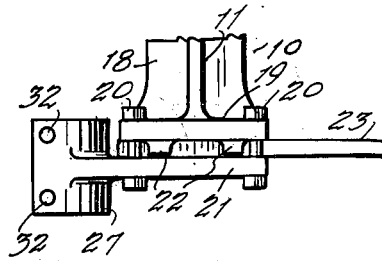
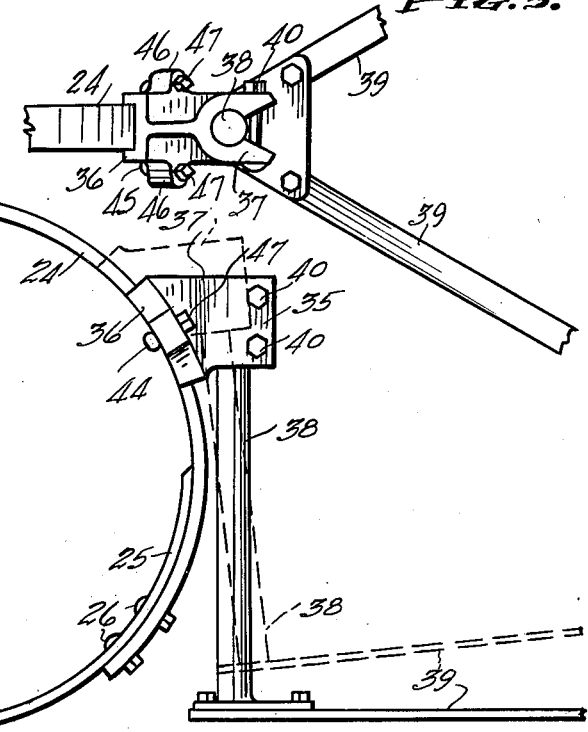
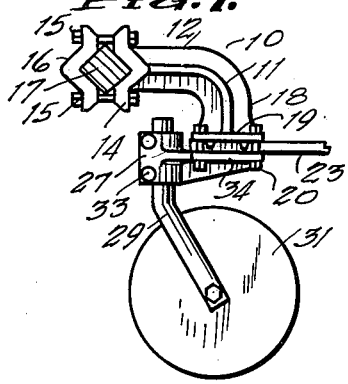
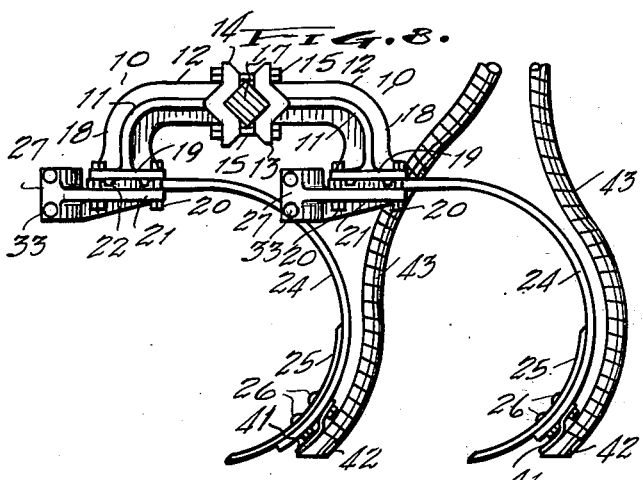
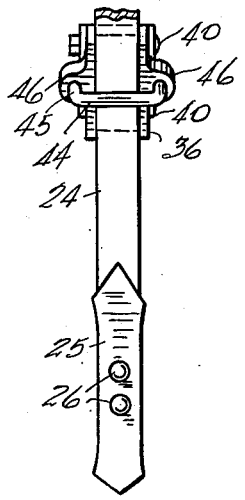
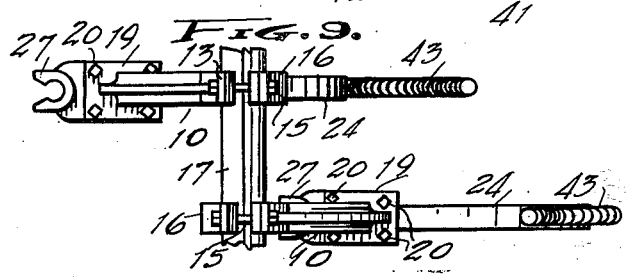
HUBERT P. WILLIAMS
INVENTOR.
BY Cecil L. Wood
ATTORNEY Patented Mar. 24, 1953

2,632,372

UNITED STATES PATENT OFFICE 2,632,372

AGRICULTURAL TOOL BRACKET

Hubert P. Williams, Fort Worth, Tex.

Application December 17, 1948, Serial No. 65,857

2 Claims. (Cl. 97—198.1)

This invention relates to agricultural implements, and it has particular reference to a utility tool bracket adapted to be employed with a tool bar on a tractor, and its principal object resides in the provision of a tool bracket of simple and economical design having means formed thereon for attachment to the said tool bar and formed with means for attaching a tool clamp for supporting a plurality of different tools in cooperative arrangement and thus minimizing the necessity for providing a tool bracket for each tool as conventionally required where it is desirable to employ two or more types of implements in one operation, and affording means whereby such implements can be interchanged, detached or installed as required.

An important object of the invention is that of providing a tractor tool bar implement by which subsoiling operations can be accomplished quickly and economically, using the tractor power lift for handling the implement, instead of drawing the same behind the tractor, and at once affording a means for attachment of various combinations of tools, such as chisels, sweeps, bedders, and the like.

Another object of the invention is that of providing a tool bracket which is especially designed for use on any type of tool bar comprising the standard equipment of all types of tractors of conventional manufacture, affording a convenient arrangement for substantially all operations, attendant upon the preparation of the soil for row crops, including subsoiling, cultivating, and even seeding.

A still further object of the invention resides in the provision of a novel tool bracket which is capable of easy attachment to the tool bar and is adapted for quick adjustment longitudinally of the said bar, whereby tools carried thereby can be spaced along the bar as desired, enabling the user to change, install or adjust various types of implements thereto without removing the invention from the tractor, thus obviating the expenditure of excess time and effort.

Broadly, the invention contemplates the provision of a tool-supporting bracket in which are embodied features of construction adapting the same to universal application, affording a highly flexible implement capable of arrangement along the tool bar in any desired spacing and extending either forwardly or rearwardly from the said bar whereby various types of tools can be cooperatively employed either rearwardly or forwardly of the said tool bar.

While the foregoing objects are paramount, other and lesser objects will become manifest as the description proceeds, taken in connection with the appended drawings wherein:

Figure 1 is a side elevational view of the invention shown attached to a tool bar of a tractor, the latter being shown in transverse section, and illustrating a sweep shank and subsoiler attached thereto.

Figure 2 is an inverted plan view of the invention, the tool bar being shown fragmentarily, and showing the sweep shank in transverse section.

Figure 3 is a perspective view of a double-pointed chisel of a type employed on the subsoiler shank.

Figure 4 is a side elevational view of a tool shank attached to the tool bracket, the latter being shown fragmentarily, and illustrating a knife attachment supported by clamps to the subsoiler shank and illustrating, in dotted lines, the adjustable positions of the said knives.

Figure 5 is a plan view of the knife-supporting clamp on the subsoiler shank and illustrating the shank and knives fragmentarily.

Figure 6 is a front view of the subsoiler shank showing a subsoiler chisel attached thereto and illustrating the knife clamp.

Figure 7 is a side elevational view of the invention, illustrating the tool bar in transverse section, and showing a coulter attached to the tool clamp, the subsoiler shank being shown fragmentarily.

Figure 8 is a side elevational view of an arrangement of a plurality of the tool brackets showing the spring type shank, having double-pointed chisels, attached to the tool clamp and illustrating the manner in which feed spouts can be attached, and Figure 9 is a plan view of the arrangement illustrated in Figure 8, the tool bar being shown fragmentarily.

The primary element of the invention comprises a substantially J-shaped casting 10 which, in cross-section, defines a cross-shape by reason of the integral bosses 11 formed on each side, as illustrated in Figures 1 and 8. On the end of the longer leg 12 of the casting 10 is formed a substantially V-shaped member 13 having extended flanges 14 which are apertured to receive bolts 15 arranged therethrough and adapted to secure a clamp member 16 opposite the member 13 by which the casting 10 is secured to a tool bar 17 shown in transverse section in Figure 1. The tool bar 17, polygonal in transverse section, is normally carried by a tractor (not shown) and is supported thereby so that the power-lift on said tractor can be utilized to raise and lower the implements attached to the tool bar 17 as desired.

While the longer leg 12 of the casting 10 is arranged normally in a horizontal position, as shown in Figures 1 and 8, the shorter leg 18 thereof extends downwardly and, in operation, remains substantially vertical. At its lower end is formed a flange 19 which is substantially rectangular in form and has apertures through which bolts 20 are arranged for securing a clamp 21 therebeneath. A plurality of aligned lugs 22 are formed on the underside of the flange 19 and are spaced laterally providing a suitable channel therebetween to receive the upper horizontal end 23 of a substantially hook-shaped shank 24 providing a flexible subsoiler tool. On the lower end of the shank 24 may be attached a double pointed chisel 25 which is secured by bolts 26, as shown in Figures 1, 2, 4 and 8. The chisel 25 is shown in perspective in Figure 3 and is of conventional design.

The clamp 21 is substantially rectangular in form and forwardly thereof is arranged an integral cylindrically formed clamp 27 having a bore 28 arranged vertically and capable of receiving a round shank 29 of a sweep 30 or a coulter 31, as illustrated in Figures 1 and 7. The clamp member 27 has apertures therein through which bolts 33 are arranged for securing the shank 29 therein. Obviously, other tools having round shanks, such as the shank 29 illustrated in Figures 1 and 7, may be applied to the tool bracket 10 in the manner described.

It is the purpose of the invention to supply a tool bracket 10 which may be attached to the tool bar 17 forwardly thereof, as in Figures 8 and 9, or rearwardly thereof as illustrated in Figures 1, 2 and 7. In this manner the tools may be arranged and spaced as required for any type of soil preparing or planting jobs, as well as cultivating. A web 34 is formed beneath the clamp 21 and extends from the lower end of the member 27 upwardly and merges with the plate portion of the clamp 21 rearwardly thereof, in the manner illustrated in Figure 1. This arrangement properly strengthens the member 21.

In Figures 4, 5 and 6 is illustrated a clamp 35 adapted to be secured to the curved shank 24 of the subsoiler attachment. The member 35 is formed with an angular flange 36 forwardly thereof adapted to be secured to the shank 24, and because of the arcuate form of the latter, the clamp 35 can be moved arcuately upwardly and downwardly on the shank 24 in the manner illustrated in Figure 4 in dotted lines. The clamp 35 has a portion 37 adapted to receive the round shank 38 of a pair of knives 39 which operate substantially and are attached to the lower end of the shank 38 and extend at angles therefrom, as illustrated in Figure 5, forming a substantially V-shape. The knives 39 are utilized for the purpose of being passed through the soil just under the surface to detach weeds, and other undesirable vegetation from the soil, in the wake of the subsoiler chisel 25 on each of the shanks 24. Bolts 40 are utilized to secure the shank 38 to the clamp 37, in the manner illustrated in Figures 4 and 5.

It is manifest, therefore, that the shank 10 may be employed as a carriage for various types of implements, affording a means whereby a plurality of different implements can be utilized at one time and carried on the tool bar 17. For example, the sweep 30 may be replaced by a bedder bottom (not shown) and several of these can be spaced along the tool bar 17 and used in bedding operations, the tools being spaced by arranging the brackets 10 along the tool bar 17 to properly space the rows in row cropping operations. Later, when vegetation appears in the drills and requires cultivating, the sweep 30, and other cultivating tools, may be attached to the tool bar 17 through the medium of the bracket 10 and a cultivating implement thus provided.

Seeding and fertilizing operations can be performed by the arrangement illustrated in Figures 8 and 9. The yieldable subsoiler shanks 24 may have suitable securing brackets 41 connected to their lower ends by one or both of the bolts 26, as illustrated in Figure 8. Suitable receptacles 42 may be attached to the brackets 41 into which the lower ends of flexible tubes 43 can be inserted, as in Figure 8, to conduct seed or fertilizer into the ground in the wake of the chisels 25 on the lower ends of the shanks 24. Suitable supporting brackets can be supplied for seed or fertilizer boxes above the tool bar 17, as desired. These members are not shown.

Having further reference to the clamp 35 for the knife attachment shown in Figures 4 and 5, this member is secured to the arcuate shank 24 through the medium of a U-bolt 44 whose right-angular portions 45 extend through ears 46 formed on the member 36 and have nuts 47 threaded on their opposite ends, in the manner shown in Figures 4 and 5. Thus, the clamp 35 can be moved arcuately along the shank 24 in the manner illustrated in dotted lines in Figure 4; the shank 38 and the knives 39 assuming any one of a variety of angles which have a minimum departure from the horizontal plane. Such an arrangement provides for operation of the knives and chisels at variable depths and in accordance with the particular soil conditions under which the operations are performed.

One of the primary objects of the invention is that of affording a tool supporting bracket which can be employed with the conventional type of tool bar supplied with most types of tractors of standard manufacture and which can be readily raised or lowered by the power lift mechanism of such tractors, obviating the necessity for drawing an implement, or various implements, behind the tractor which are not amenable to the power lift mechanism and consequently are more difficult to handle. By eliminating the necessity for a plurality of various types of implements to be drawn behind the tractor a more economical arrangement is also provided. The clamp 21, which serves both to detachably secure the shank 24 to the brackets 10, and the shank 29 of the sweep 30, affords an arrangement whereby various types of implements can be secured or detached from the tool bar 17 at will and with a minimum of difficulty and time.

While the invention has been described with great particularity, it is obvious that certain changes and modifications in the structure may be resorted to, from time to time, by persons skilled in the art without departing from the spirit and intent of the invention or the scope of the appended claims.

What is claimed is:

1. In a tool bracket assembly for agricultural implements on a tool bar on a farm tractor, the combination comprising a J-shaped bracket having a flange formed on the end of the longer leg thereof transversely of the axis of the said leg, the said flange being conformably engageable with the angular surfaces of said tool bar, a clamp member bolted to said flange on the opposite side of said tool bar rigidly securing said bracket thereto, a rectangular plate formed integral with and transversely of the shorter end of said bracket, spaced lugs formed on the surface of said plate opposite said bracket and defining a channel parallel with the longer leg of said bracket, a clamp detachably secured to the said plate and formed with an integral sleeve having its axis substantially parallel to the shorter leg of said bracket and capable of operatively supporting a tool shank.

2. In a tool carrying bracket for farm implements on a tool bar of polygonal cross-section on a farm tractor, the combination comprising a J-shaped bracket formed with a longer leg and a shorter leg arranged substantially at right angles with respect to each other, a flange formed transversely of the end of the longer leg and having a V-shaped recess defined in the face of said flange whereby to conformably engage said polygonal tool bar and having apertures for bolts arranged therethrough, a clamp member formed to complement said flange and retained by said bolts, an integral plate formed on the end of said shorter leg and arranged in a plane at right angles to the plane of said flange, the said plate having a series of apertures therein and a plurality of spaced and aligned lugs in its face opposite said leg to define a channel therebetween, and a clamp member adapted to oppose said plate and be secured thereto by bolts arranged through the apertures therein and having a cylindrical portion integral therewith whose axis is transverse to the plane surfaces of said plate and adapted to receive and secure a tool shank.

HUBERT P. WILLIAMS.

REFERENCES CITED

The following references are of record in the file of this patent:

UNITED STATES PATENTS

| Number | Name | Date |
|---|---|---|
| 447,781 | Lux | Mar. 10, 1891 |
| 733,516 | Swanson | July 14, 1903 |
| 823,340 | Lindgren | June 12, 1906 |
| 986,674 | Beckman | Mar. 14, 1911 |
| 1,732,941 | Lennon | Oct. 22, 1929 |
| 1,982,862 | Erdman | Dec. 4, 1932 |
| 2,196,037 | Silver | Apr. 2, 1940 |
| 2,259,890 | Hipple | Oct. 21, 1941 |
| 2,322,076 | Watson | June 15, 1943 |